(12) United States Patent
Meijers et al.

(10) Patent No.: US 10,773,409 B2
(45) Date of Patent: Sep. 15, 2020

(54) CUTTING DEVICE AND METHOD FOR CUTTING-OFF A LENGTH OF A CONTINUOUS STRIP TO FORM A TIRE COMPONENT

(71) Applicant: VMI Holland B.V., Epe (NL)

(72) Inventors: Pieter Cornelis Meijers, Epe (NL); Jeroen Van Tienhoven, Epe (NL); Karel Johannes Van Assenbergh, Epe (NL); Ruud Albertus Gerhardus Hesselink, Epe (NL)

(73) Assignee: VMI HOLLAND B.V. (NL)

( * ) Notice: Subject to any disclaimer, the term of this patent is extended or adjusted under 35 U.S.C. 154(b) by 0 days.

(21) Appl. No.: 16/473,213

(22) PCT Filed: Dec. 14, 2017

(86) PCT No.: PCT/NL2017/050836
§ 371 (c)(1),
(2) Date: Jun. 24, 2019

(87) PCT Pub. No.: WO2018/117818
PCT Pub. Date: Jun. 28, 2018

(65) Prior Publication Data
US 2019/0358841 A1    Nov. 28, 2019

(30) Foreign Application Priority Data

Dec. 23, 2016 (NL) ..................... 2018057

(51) Int. Cl.
*B26D 1/00* (2006.01)
*B26D 1/60* (2006.01)
(Continued)

(52) U.S. Cl.
CPC ........... *B26D 1/0006* (2013.01); *B26D 1/605* (2013.01); *B26D 5/02* (2013.01); *B26D 5/20* (2013.01);
(Continued)

(58) Field of Classification Search
CPC ........ B26D 1/0006; B26D 1/605; B26D 5/02; B26D 5/20; B26D 7/0625; B29D 30/46
See application file for complete search history.

(56) References Cited

U.S. PATENT DOCUMENTS 3,757,618 A * 9/1973 Kuts ................... B26D 1/0006
                                                     83/471.3
4,406,201 A * 9/1983 Barnes ................ B26D 1/0006
                                                     83/487
(Continued)

FOREIGN PATENT DOCUMENTS

CN        1575959        2/2005    ............ B29C 47/00
CN       101107119       1/2008    ............ B29D 30/44
(Continued)

OTHER PUBLICATIONS

Written Opinion issued in corresponding Japanese Patent Application Serial No. 2018-530066 (1 pg)—in English, dated Jul. 29, 2019.
(Continued)

*Primary Examiner* — Omar Flores Sanchez
(74) *Attorney, Agent, or Firm* — Hayes Soloway P.C.

(57) ABSTRACT

Disclosed is a cutting device and a method for cutting-off a length of a continuous strip to form a tire component, wherein the cutting device includes a cutting member for cutting the continuous strip at a cutting position and a feeding member that is movable in a feeding direction for feeding the length of the continuous strip in the feeding direction past said cutting position, wherein the feeding
(Continued)

member is retractable in a retraction direction. The cutting device further includes a manipulator for retaining the length as the feeding member is retracted in the retraction direction, wherein the cutting position is located on the manipulator and wherein the cutting member and the manipulator are movable together in the feeding direction to cut-off of the length of the continuous strip at the cutting position on the manipulator while moving the length of the continuous strip in the feeding direction.

30 Claims, 11 Drawing Sheets

(51) Int. Cl.
| | | |
|---|---|---|
| *B26D 5/02* | (2006.01) | |
| *B26D 5/20* | (2006.01) | |
| *B26D 7/06* | (2006.01) | |
| *B29D 30/46* | (2006.01) | |

(52) U.S. Cl.
CPC .......... *B26D 7/0625* (2013.01); *B29D 30/46* (2013.01); *B29D 2030/463* (2013.01)

(56) References Cited

U.S. PATENT DOCUMENTS

| | | | | |
|---|---|---|---|---|
| 5,679,205 | A * | 10/1997 | Marks ................ | B26D 1/0006 156/406.6 |
| 6,355,126 | B1 | 3/2002 | Ogawa ................ | B29D 30/38 |
| 6,928,911 | B1 * | 8/2005 | Ratkus ............... | B26D 1/0006 83/171 |
| 7,171,884 | B2 * | 2/2007 | De Torre ............ | B26D 1/0006 83/501 |
| 8,245,615 | B2 * | 8/2012 | Brazier .............. | B26D 1/18 83/171 |
| 8,256,481 | B2 * | 9/2012 | Lammlein ........... | B26D 3/003 156/353 |
| 8,561,511 | B2 * | 10/2013 | Downing ............ | B26D 3/08 83/100 |
| 8,596,177 | B2 | 12/2013 | Gutknecht et al. ............ | 83/508 |
| 9,579,859 | B2 | 2/2017 | Kaneko ............... | B29D 30/06 |
| 1,008,114 | A1 | 9/2018 | Deboeuf et al. ....... | B29D 30/46 |
| 2003/0079593 | A1* | 5/2003 | De Torre ............. | B26D 3/003 83/582 |
| 2005/0023717 | A1 | 2/2005 | Watanuki ............ | B29C 47/00 |
| 2006/0196332 | A1* | 9/2006 | Downing ............ | B26D 7/018 83/100 |
| 2008/0314216 | A1 | 12/2008 | Delgado et al. ............... | 83/452 |
| 2010/0064868 | A1* | 3/2010 | Michael .............. | B26D 3/005 83/54 |
| 2010/0095820 | A1 | 4/2010 | Gutknecht ................. | 83/409 |
| 2010/0139467 | A1 | 6/2010 | Gutknecht et al. .............. | 83/72 |
| 2010/0154611 | A1* | 6/2010 | Lammlein, Jr. ....... | B26D 3/003 83/78 |
| 2011/0089228 | A1 | 4/2011 | Goto ............................ | 234/128 |
| 2015/0298409 | A1* | 10/2015 | Deboeuf, Jr. ........ | B29D 30/305 156/117 |
| 2019/0358841 | A1* | 11/2019 | Meijers .............. | B26D 1/0006 |

FOREIGN PATENT DOCUMENTS

| | | | | |
|---|---|---|---|---|
| CN | 101327659 | 12/2008 | ............ | B29D 30/38 |
| CN | 101646535 | 2/2010 | ............ | B26D 1/20 |
| CN | 102056736 | 5/2011 | ............ | B31B 1/14 |
| CN | 104703786 | 6/2015 | ............ | B29D 30/46 |
| CN | 105189099 | 12/2015 | ............ | B29D 30/16 |
| CN | 105829086 | 8/2016 | ............ | B29D 30/06 |
| EP | 1831004 | 2/2009 | ............ | B29D 30/44 |
| EP | 2978596 | 5/2018 | ............ | B29D 30/16 |
| JP | 2005059593 | 3/2005 | ........... | B29C 48/305 |
| JP | 2008525223 | 7/2008 | ............ | B29D 30/44 |
| JP | 2012076195 | 4/2012 | ............ | B26D 1/08 |
| WO | WO99/17920 | 4/1999 | ............ | B29D 30/16 |
| WO | WO 2006068474 | 6/2006 | ............ | B29D 30/44 |
| WO | WO 2014155258 | 10/2014 | ............ | B29D 30/16 |

OTHER PUBLICATIONS

Notice of Reasons for Refusal issued in corresponding Japanese Patent Application Serial No. 2018-530066 (2 pgs)—in English, dated May 21, 2019.

Decision to Grant issued in corresponding Japanese Patent Application Serial No. 2018-530066 (5 pgs) with English Translation, dated Dec. 23, 2019.

International Search Report and Written Opinion issued in application No. PCT/NL2017/050836, dated Mar. 2, 2018 (11 pgs).

Official Action issued in related Chinese Patent Application Serial No. 201780078808.3, dated May 22, 2020, with search and English translation (9 pages).

\* cited by examiner

CUTTING DEVICE AND METHOD FOR CUTTING-OFF A LENGTH OF A CONTINUOUS STRIP TO FORM A TIRE COMPONENT

BACKGROUND

The invention relates to a cutting device and a method for cutting-off a length of a continuous strip to form a tire component.

WO 2006/068474 A1 discloses an assembly for producing a strip from a band of flexible material, having a device for picking up, displacing and placing said bands. The device is able to reach past the cutting line to pick up a cut-off strip and to pull it onto a discharge conveyor upstream of the cutting line. The band is obtained from an extruder. The extruder is arranged for extruding the band at a constant extrusion speed. However, the cutting and feeding at the known device is intermittent, resulting in jerks and jolts in the band upstream of the device. It is known to absorb these jerks and jolts with a suitable buffer, e.g. a festooner or a dancer roll.

It is an object of the present invention to a cutting device and a method for cutting-off a length of a continuous strip to form a tire component, wherein the effect of the cutting on the feeding of the continuous strip into the device can be reduced.

SUMMARY OF THE INVENTION

According to a first aspect, the invention provides a cutting device for cutting-off a length of a continuous strip to form a tire component, wherein the cutting device comprises a cutting member for cutting the continuous strip at a cutting position and a feeding member that is movable in a feeding direction past the cutting position for feeding the length of the continuous strip in said feeding direction past said cutting position, wherein the feeding member is at least partially retractable in a retraction direction for exposing the length of the continuous strip to the cutting member at the cutting position and wherein the cutting device further comprises a manipulator for taking over and retaining the length of the continuous strip from the feeding member as the feeding member is retracted in the retraction direction, wherein the cutting position is located on the manipulator and wherein the cutting member and the manipulator are movable together in the feeding direction to cut-off of the length of the continuous strip at the cutting position on the manipulator while moving the length of the continuous strip in said feeding direction.

By moving the cutting member and the manipulator together in the feeding direction during the cutting, the continuous strip can continuously be fed into the cutting device in the feeding direction. Hence, an interruption in the feeding process as a result of the cutting can be prevented. Hence, jerks and bolts in the continuous strip upstream of the cutting device can be prevented. In contrast to the prior art device, the cutting device according to the present invention does not require a buffer such as a festooner or a dancer roll.

In an embodiment the cutting device comprises a first drive for driving the movement of the cutting member in the feeding direction and a second drive for driving the movement of the manipulator in the feeding direction, wherein the first drive and the second drive are synchronized to move the cutting member and the manipulator, respectively, at the same feeding speed in the feeding direction during the cutting-off of the length of the continuous strip. Hence, the cutting member and the manipulator can be driven at the same feeding speed.

In an embodiment thereof the cutting device further comprises a control unit for controlling the first drive and the second drive to synchronously move the cutting member and the manipulator, respectively, at the same feeding speed in the feeding direction during the cutting-off of the length of the continuous strip. Hence, the operation of the cutting device can be automated to a large extent by controlling the drives with the use of the control unit.

In a further embodiment the cutting member is movable together with the feeding member in the feeding direction and the retraction direction. Hence, the movements of the cutting member and the feeding member can be related to each other, which can simplify the operation and/or control of the cutting device.

In an embodiment thereof the feeding member is a telescopic feeding conveyor that is extendable in the feeding direction past the cutting position and retractable in the retraction direction opposite to the feeding direction past the cutting position. Such a telescopic feeding conveyor is an effective means to advance the length of the continuous strip past the cutting position and to expose said advanced length to the cutting member at the cutting position by retracting said telescopic feeding conveyor.

In an embodiment thereof the telescopic feeding conveyor comprises a fixed portion that is fixed in the feeding direction and a telescopic portion that is movable with respect to the fixed portion in the feeding direction and the retraction direction, wherein the cutting member is fixed with respect to the telescopic portion in the feeding direction and the retraction direction. By fixing the cutting member with respect to the telescopic portion, the cutting member can be moved together with said telescopic portion, thereby simplifying the operation and/or control of the cutting device.

In a combination of the aforementioned embodiment and the embodiment that introduced the first drive, the first drive is arranged for driving both the telescopic portion of the telescopic feeding conveyor and the movement of the cutting member. Hence, a single drive can be used to drive both the telescopic portion and the cutting member, thereby simplifying the operation and/or control of the cutting device.

In a further embodiment the manipulator is provided with an anvil member at the cutting position for cooperating with the cutting member to cut-off the length of the continuous strip. The anvil member can be made of a material that provides a stable cutting surface for cooperating with the cutting member and/or that is not easily damaged by the cutting.

In a further embodiment the cutting member comprises a first knife that is movable in a cutting direction towards the cutting position on the manipulator to cut-off the length of the continuous strip at the cutting position along a first cutting profile. Preferably, the first cutting profile is at least partially linear, non-linear, V-shaped, symmetric and/or asymmetric. Hence, a cut according to a predetermined cutting profile can be made.

In a further embodiment thereof the first cutting profile is a symmetric, non-linear cutting profile, wherein the feeding member is arranged for feeding the continuous strip past the cutting position along feeding path in the feeding direction, wherein the feeding path and the symmetry of the first cutting profile are offset with respect to each other. Hence, a symmetric cutting profile can be used to asymmetrically cut-off the length of the continuous strip.

In a further embodiment thereof the cutting member comprises a first retaining element for retaining the length of the continuous strip to the cutting member at or near the first cutting profile. Said first retaining element can be used to retain the length of the continuous strip prior to the takeover by the manipulator. In addition, the first retaining element can be used to retain the length of the continuous strip during cutting.

In a further embodiment thereof the cutting member comprises a second knife that is movable in the cutting direction towards the cutting position on the manipulator to cut-off the length of the continuous strip at the cutting position along a second cutting profile that is different from the first cutting profile. Hence, the length of the continuous strip can be cut-off along different cutting profiles, depending on the cutting requirements.

In an embodiment thereof the cutting member comprises a knife actuator that is arranged for selectively moving one of the first knife and the second knife with respect to the other of the first knife and the second knife in the cutting direction towards the cutting position on the manipulator. Hence, only one of the knives can be made to contact and cut-off the length of the continuous strip.

In a further embodiment thereof, prior to the cutting, the cutting member is movable with respect to the manipulator to align one of the first knife and the second knife in the cutting direction with the cutting position on the manipulator. By correctly aligning either the first knife or the second knife with respect to the cutting position, the length of the continuous strip can be cut by the aligned knife at a single cutting position.

In a further embodiment thereof the first knife and the second knife are spaced apart in the feeding direction. Hence, the knives can be aligned with the cutting position by moving the cutting member in the feeding direction over the distance by which the knives are spaced apart.

In a further embodiment thereof the cutting member comprises a second retaining element for retaining the length of the continuous strip between the first cutting profile and the second cutting profile. The second retaining element, alone or in combination with the first retaining element, can be used to retain the length of the continuous strip during cutting.

In a further embodiment the manipulator comprises a retaining element for retaining the length of the continuous strip to the manipulator. Hence, the manipulator can be used in any orientation, e.g. an up-side-down orientation.

In a further embodiment the retaining element is a vacuum retaining element or a magnetic retaining element. The vacuum retaining element can be used to retain a continuous strip of rubber or elastomeric material. The magnetic retaining element can be used to retain a continuous strip comprising ferromagnetic elements, e.g. steel reinforcement cords.

According to a second aspect, the invention provides a method for cutting-off a length of a continuous strip to form a tire component with the use of the aforementioned cutting device, wherein the method comprises the steps of:

using the feeding member to feed the length of the continuous strip in the feeding direction past the cutting position;

using the manipulator to take over and retain the length of the continuous strip from the feeding member;

retracting at least a part of the feeding member in the retraction direction to expose the length of the continuous strip to the cutting member at the cutting position while retaining the length of the continuous strip as the feeding member is retracted in the retraction direction; and moving the cutting member and the manipulator together in the feeding direction to cut-off of the length of the continuous strip at the cutting position on the manipulator while moving the length of the continuous strip in said feeding direction.

The method and its embodiments relate to the practical implementation of the cutting device and its respective embodiments. The advantages of the method are the same as the advantages previously discussed in relation to the cutting device, and will not be repeated hereafter.

In a preferred embodiment of the method the cutting device is arranged for continuously feeding the length of the continuous strip in the feeding direction during the feeding, retracting, take over and cutting-off. Hence, interruptions in the feeding of the continuous strip can be prevented throughout the steps of the method.

In an embodiment thereof a subsequent length of the continuous strip is already being fed in the feeding direction towards the cutting position as the previous length of the continuous strip is being cut-off. Therefore, a new or subsequent length of the continuous strip can already be prepared on the feeding member, which can significantly reduce the cycle time.

In another preferred embodiment of the method the cutting member and the manipulator are synchronously moved at the same feeding speed in the feeding direction during the cutting-off of the length of the continuous strip.

In a further embodiment of the method the cutting member is moved together with the feeding member in the feeding direction and the retraction direction.

In an embodiment thereof the feeding member is a telescopic feeding conveyor with a fixed portion that is fixed in the feeding direction and a telescopic portion that is movable with respect to the fixed portion in the feeding direction and the retraction direction, wherein the cutting member is fixed with respect to the telescopic portion in the feeding direction, wherein the telescopic portion of the telescopic feeding conveyor and the cutting member are moved together.

In a further embodiment of the method the cutting member comprises a first knife that is arranged to cut-off the length of the continuous strip at the cutting position along a first cutting profile, wherein the cutting member comprises a second knife that is arranged to cut-off the length of the continuous strip at the cutting position along a second cutting profile that is different from the first cutting profile, wherein one of the first knife and the second knife is selectively moved with respect to the other of the first knife and the second knife in a cutting direction towards the cutting position on the manipulator.

In a preferred embodiment of the method, prior to the cutting, the cutting member is moved with respect to the manipulator to align one of the first knife and the second knife in the cutting direction with the cutting position on the manipulator.

In a further embodiment the method further comprises the step of aligning a different one of the first knife and the second knife prior to cutting a subsequent length of the continuous strip, wherein the method further comprises the step of cutting a waste length of the continuous strip to form a new leading end of the continuous strip that has been cut with the different knife. Cutting-off a relatively short waste length between changing over from one knife to another, allows for the leading end of the continuous strip, that was cut with the previously used knife, to be cut-off using the newly aligned knife.

In another further embodiment of the method the cutting member comprises a first knife that is arranged to cut-off the length of the continuous strip at the cutting position along a symmetric, non-linear first cutting profile, wherein the feeding member is arranged for feeding the continuous strip past the cutting position along feeding path in the feeding direction, wherein the feeding path and the symmetry of the first cutting profile are offset with respect to each other.

In a preferred embodiment of the method the cutting device is used to cut-off the length of the continuous strip to form a gum strip. With the cutting device according to one or more of the aforementioned embodiments, gum strips can be produced quickly and reliably, without requiring a buffer between the supply device and the cutting device. Moreover, when asymmetrically cutting a gum strip, said gum strip can be wrapped around the edge of a breaker ply, where the part of the gum strip at one side of the breaker ply is supposed to be larger than the part of the gum strip at the other side of the breaker ply.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figure 1:
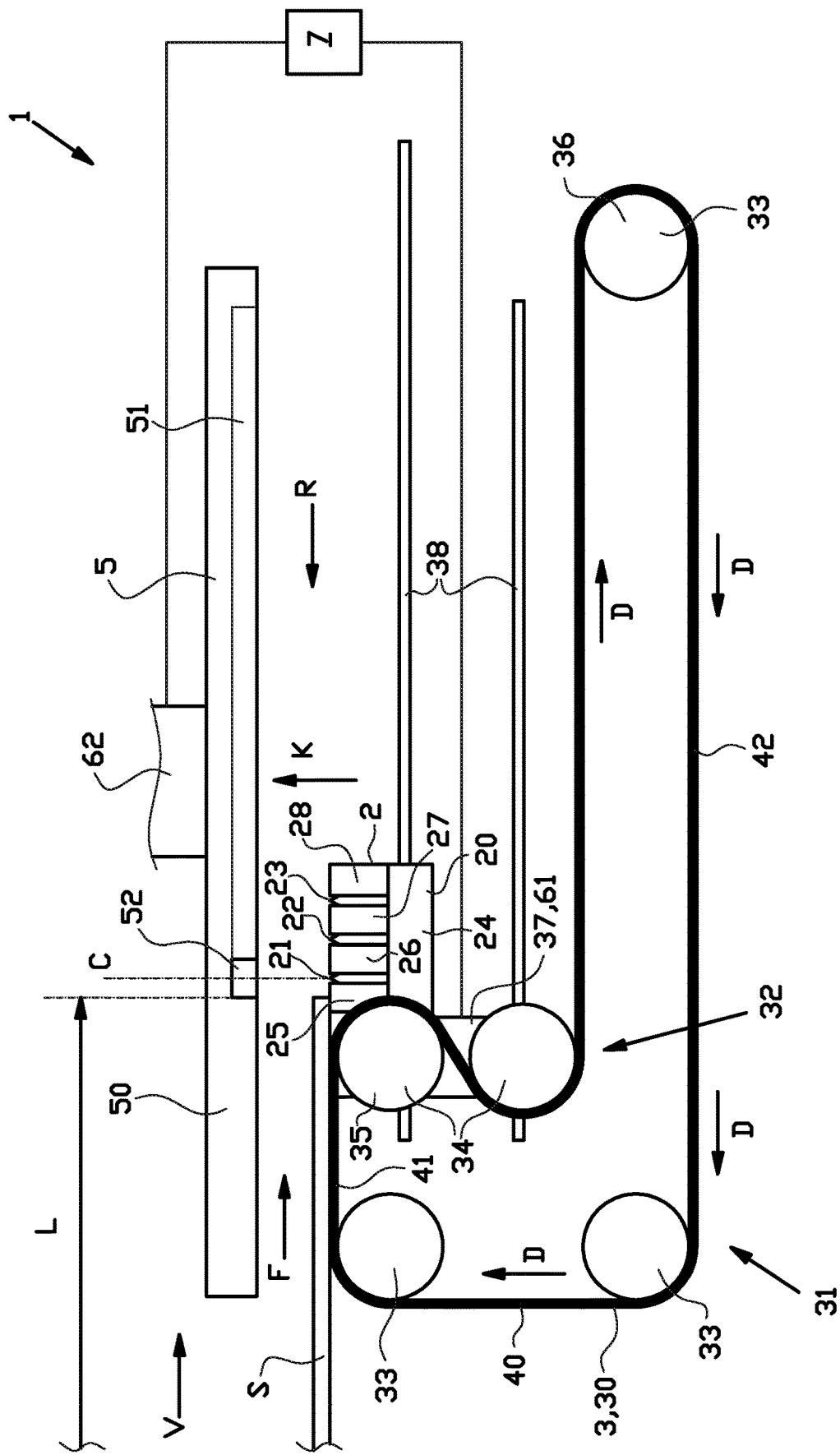
FIGS. 1-8 show side views of a cutting device according to the invention during the steps of a method for cutting-off a length of a continuous strip to form a tire component.

FIGS. 1-8 show a cutting device 1 according to an exemplary embodiment of the invention. Said cutting device 1 is arranged for cutting-off a length L of a continuous strip S to form a tire component, in this exemplary embodiment a gum strip 9. Gum strips 9 are used to cover sharp edges of tire layers, e.g. the sharp edges of a breaker ply.

The cutting device 1 is arranged for receiving the continuous strip S from a supply device, e.g. directly from an extruder (not shown). The extruder is arranged for extruding the continuous strip S at an extrusion speed. The cutting device 1 comprises a cutting member 2 for cutting the continuous strip S at a cutting position C and a feeding member 3 that is movable in a feeding direction F past the cutting position C for feeding the length L of the continuous strip S in said feeding direction F past said cutting position C. The feeding member 3 is at least partially retractable in a retraction direction R for exposing the length of the continuous strip to the cutting member 2 at the cutting position C. The cutting device 1 further comprises a manipulator 5 for taking over and retaining the length L of the continuous strip S from the feeding member 3 as the feeding member 3 is retracted in the retraction direction R, in a manner that will be described in more detail hereafter.

Figure 9:
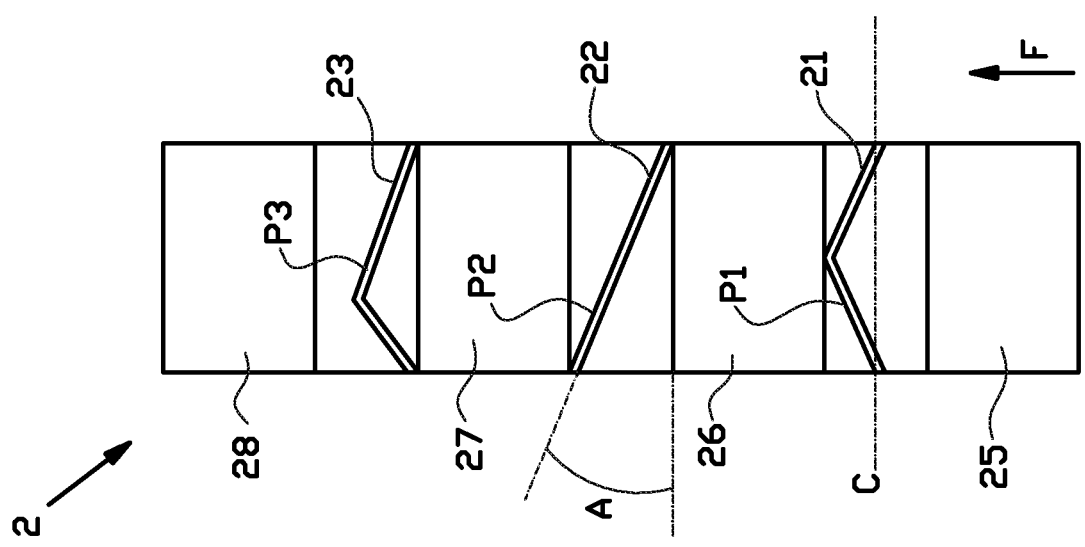
FIG. 9 shows a top view of a cutting member of the cutting device according to FIGS. 1-8.

As best seen in FIGS. 1 and 9, the cutting member 2 comprises a knife holder 20 with a first knife 21, a second knife 22 and a third knife 23. The skilled person will appreciate that more or fewer knives may be provided. As shown in FIG. 9, each knife 21-23 is provided with a different cutting profile P1, P2, P3 to cut-off the length L of the continuous strip S along said specific cutting profile P1, P2, P3. In particular, in this example, the first knife 21 is provided with a first cutting profile P1 that is V-shaped and symmetrical. The second knife 22 is provided with a second cutting profile P2 that is linear and extends at an oblique cutting angle A with respect to the feeding direction F. The third knife 23 is provided with a third cutting profile P3 that, like the first cutting profile P1, is V-shaped, yet asymmetrical. Other cutting profiles, such as linear, non-linear, symmetric or asymmetric cutting profiles, can be provided depending on the cutting requirements. It is also envisioned that the knives are adjustable to change the cutting angle A or to change the angle between the legs of the V-shape.

Alternatively, the knives 21-23 may be provided with the same cutting profile, such that the cutting device 1 can be used for a longer time without interchanging the knives 21-23.

Figure 7:
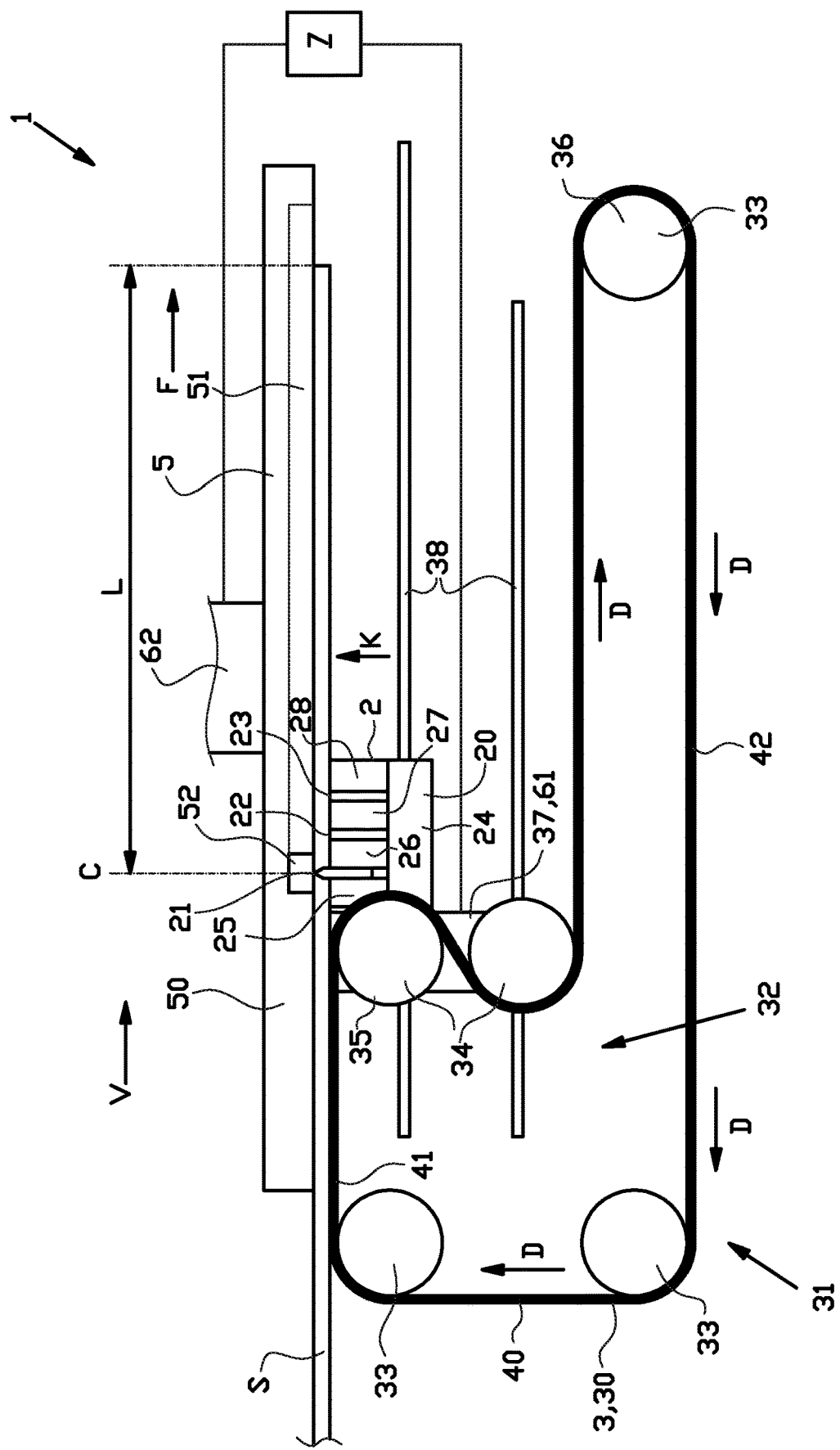

Said knives 21-23 are spaced apart in the feeding direction F. The cutting member 2 is provided with a knife actuator 24 that is arranged for selectively moving one of the knives 21-23 with respect to the other of the knives 21-23 in a cutting direction K towards the cutting position C, as shown in FIG. 7 for the first knife 21, for cutting-off the length L of the continuous strip S at the cutting position C. In this example, the cutting direction K is an upward cutting direction K, transverse or perpendicular to the feeding direction F. Prior to cutting, the cutting member 2 is movable in the feeding direction F to align one of the knives 21-23 in the cutting direction K with the cutting position C.

The cutting member 2 further comprises one or more retaining elements 25, 26, 27, 28 for retaining the length L of the continuous strip S to the cutting member 2 at or near the respective cutting profiles P1-P3. In particular, a first retaining element 25 is provided upstream of the first knife 21 in the feeding direction F, a second retaining element 26 is provided between the first knife 21 and the second knife 22, a third retaining element is provided between the second knife 22 and the third knife 23 and a fourth retaining element 28 is provided downstream of the third knife 23 in the feeding direction F. The retaining elements 25-28 are preferably magnetic retaining elements 25-28 or vacuum retaining elements 25-28.

As shown in FIG. 1, the feeding member 3 in this exemplary embodiment is a telescopic feeding conveyor 30 that is extendable in the feeding direction F past the cutting position C and retractable in the retraction direction R opposite to the feeding direction F past the cutting position C. The telescopic feeding conveyor 30 comprises a fixed portion 31 that is fixed in the feeding direction F and a telescopic portion 32 that is movable with respect to the fixed portion 31 in the feeding direction F and the retraction direction R. The fixed portion 31 and the telescopic portion 32 comprise a plurality of fixed pulleys 33 and a plurality of movable pulleys 34, respectively. The telescopic feeding conveyor 30 further comprises an endless belt 40 that is arranged in a loop around said plurality of pulleys 33 to form a transport run 41, in this example an upper run, and a return run 42, in this example a lower run, of the telescopic feeding conveyor 30. At least one of the pulleys 33, 34 is a driven pulley to move the endless belt 40 in a conveying direction D, so that the continuous strip S is continuously advanced at a feeding speed V in the feeding direction F on the transport run 41 of the telescopic feeding conveyor 30.

One of the movable pulleys 34 forms a first head pulley 35 at the leading end of the transport run 41 of the telescopic feeding conveyor 30 in the feeding direction F and one of the fixed pulleys 33 forms a second head pulley 36 at leading end of the return run 42 of the telescopic feeding conveyor 30 in the feeding direction F. The movable pulleys 34 of the telescopic portion 32 are mounted on a carriage 37 that is movable along a guide rail 38 in the feeding direction F and the retraction direction R. The cutting device 1 comprises a first drive 61 for driving the telescopic portion 32 in the feeding direction F and the retraction direction R. In particular, the first drive 61 is arranged for driving one of the movable pulleys 34 at a faster or slower speed than the speed than the fixed pulleys 33, so that the movable pulleys 34 of the telescopic portion 32 are moved along the guide rail 38. Hence, the location of the first head pulley 41 can be telescopically extended and retracted in the feeding direction F and the retraction direction R, respectively, with respect to the fixed portion 31 of the telescopic feeding conveyor 30 by moving the carriage 37 with the telescopic portion 32 of the telescopic feeding conveyor 30 mounted thereon along the guide rail 38 in said respective feeding direction F and retraction direction R with respect to the second head pulley 36. During said extension and retraction, the endless belt 40 may continuously be driven in the conveyance direction D to advance the continuous strip S supported on the transport run 41 without interruption in the feeding direction F.

Figure 4:
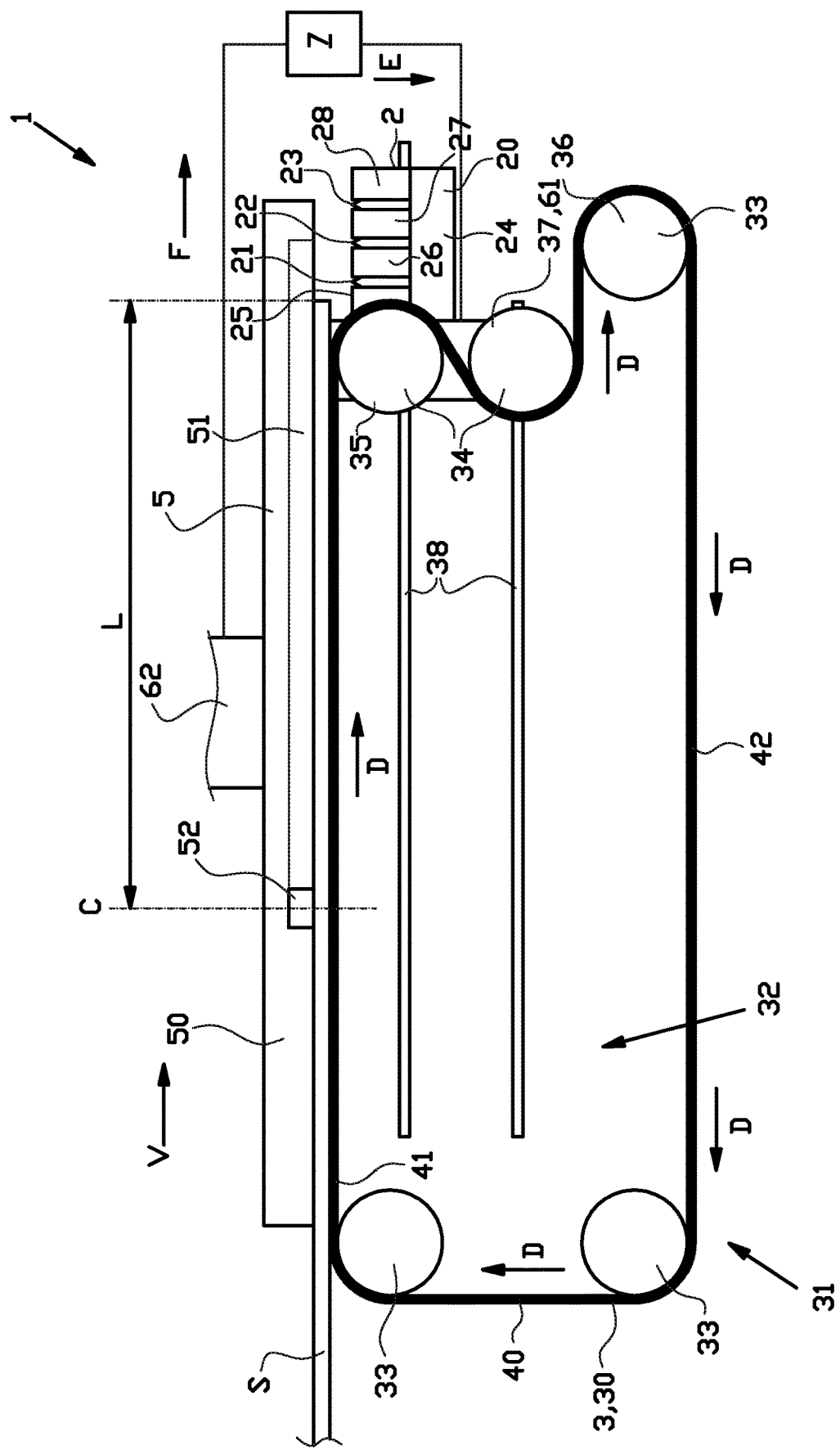

In this example, the cutting member 2 is fixed with respect to or mounted onto the same carriage 37 that holds the telescopic portion 32. Hence, the movement of the cutting member 2 in the feeding direction F and the retraction direction R can be driven by the same first drive 61 that drives the movement of the telescopic portion in said respective directions F, R. Alternatively, the cutting member 2 may be driven by a separate drive (not shown). Preferably, the cutting member 2 is movable in a recessing direction E opposite to the cutting direction K into a recessed position, as shown in FIG. 4, spaced apart from the manipulator 5.

As shown in FIG. 1, the manipulator 5 comprises a retaining body 50 and one or more retaining elements 51 for retaining the length L of the continuous strip S to the retaining body 50. The one or more retaining elements 51 are preferably magnetic retaining elements 51 or vacuum retaining elements 51. The cutting device 1 is provided with a second drive 62 for moving the manipulator 5 in the feeding direction F and the retraction direction R. In this example, the second drive 62 is additionally arranged for moving the manipulator 5 towards the feeding member 3 in a pick-up direction B opposite to the cutting direction K. As seen in FIGS. 1-8, the cutting position C is located on, fixed with respect to and/or moves together with the manipulator 5. In particular, the manipulator 5 comprises an anvil member 52 at the cutting position C for cooperating with the cutting member 2 to cut-off the length L of the continuous strip S. The anvil member 52 may be of a suitably hard material such that it provides a stable cutting surface for the knives 21-23 of the cutting member and so that it is not easily damaged by the cutting action of the knives 21-23.

The first drive 61 and the second drive 62 are synchronized to move the cutting member 2, the feeding member 3 and the manipulator 5 at a feeding speed V in the feeding direction F during the cutting-off of the length L of the continuous strip 2. More in particular, the cutting device 1 further comprises a control unit 7 that is operationally and/or electronically connected to the first drive 61 and the second drive 62 to control said synchronized movements of the cutting member 2, the feeding member 3 and the manipulator 5.

A method for cutting-off a length L of the continuous strip S to form a tire component with the use of the aforementioned cutting device 1 will be described hereafter with reference to FIGS. 1-9.

FIG. 1 shows the situation in which the continuous strip S is fed from a supply device (not shown) in the feeding direction F onto the feeding member 3. In this example, the leading end of the continuous strip S is retained by the first retaining element 25 of the cutting member 2. The feeding member 3 is in a retracted position and is ready to feed the continuous strip S further in the feeding direction F. In the case of the telescopic feeding conveyor 30, the first head pulley 35 has been moved together with the telescopic portion 32 in the retraction direction R with respect to the second head pulley 36. The transport run 41 is now relatively short and is ready to be extended in the feeding direction F by moving the telescopic portion 32 in the feeding direction F again. The situation as shown in FIG. 1 may be the last step of a previous cycle of the method, in which the manipulator 5 has just deposited a freshly cut-off length L of the continuous strip S onto a nearby discharge device (not shown). The manipulator 5 is in a standby position spaced apart from the continuous strip S. The manipulator 5 is empty and ready to retain a new length L of the continuous strip S.

Figure 2:
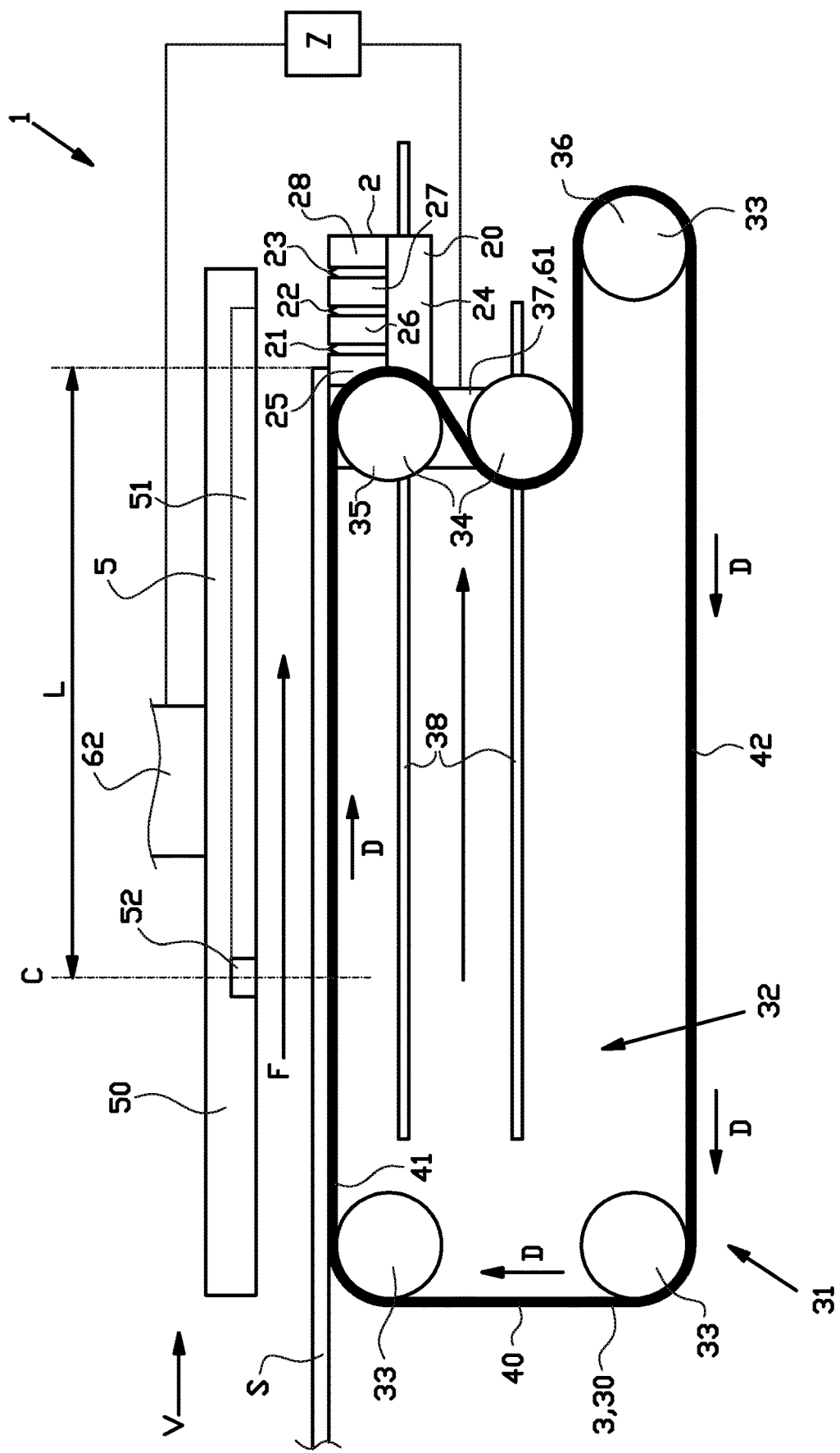

FIG. 2 shows the situation in which the feeding member 3 has been operated to feed the length L of the continuous strip S at the feeding speed V in the feeding direction F past the cutting position C. In particular, one or more of pulleys 33, 34 of the telescopic feeding conveyor 30 have been driven to move the endless belt 40 in the conveyance direction D at the feeding speed V to advance the continuous strip S, supported on the transport run 41 of the telescopic feeding conveyor 30, in the feeding direction F. Said feeding speed V may be equal to the supply speed of the supply device, e.g. the extrusion speed, or may be slightly different, e.g. to pull on the continuous strip S during the feeding. Meanwhile, the telescopic portion 32 of the telescopic feeding conveyor 30 has been moved by the first drive 61 in the feeding direction F at the same feeding speed V to increase the length of the transport run 41 in said feeding direction F. Hence, the feeding member 3 continuous to support the length L of the continuous strip S as said length L is advanced in the feeding direction F.

Figure 3:
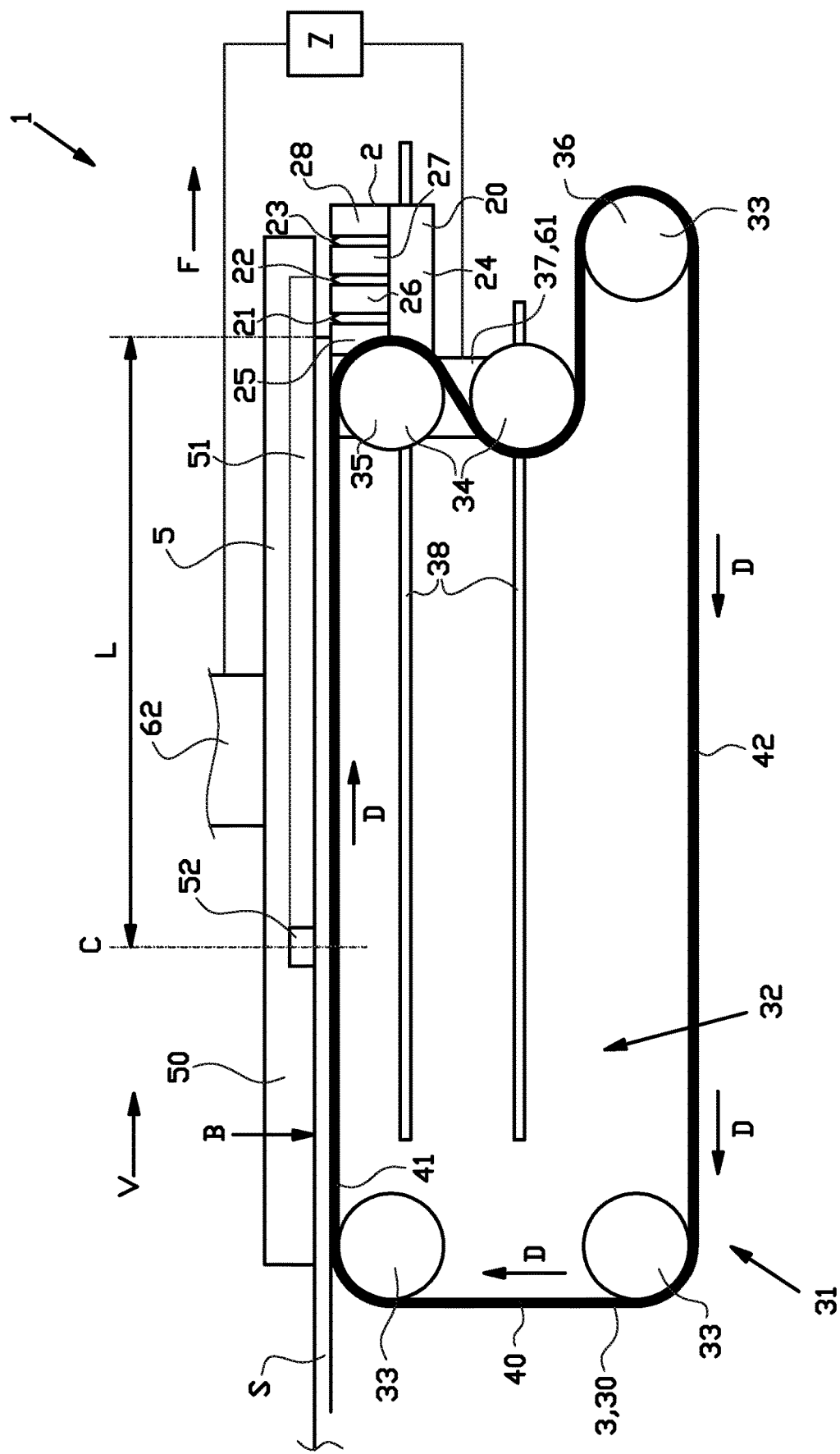

FIG. 3 shows the situation in which the length L of the continuous strip S that has to be cut-off has been moved fully past the cutting position C on the manipulator 5. Now the manipulator 5 is moved in the pick-up direction B towards the continuous strip S at the feeding member 3 to take over and retain the length L of the continuous strip S from the feeding member 3. Once the manipulator 5 is in contact with the length L of the continuous strip S, the one or more retaining elements 51 are activated to retain the length L of the continuous strip S to the retaining body 50. Meanwhile, the feeding member 3 is still advancing the continuous strip S at the feeding speed V in the feeding direction F. In the case of the telescopic feeding conveyor 30, the cutting member 2, the telescopic portion 32 and the manipulator 5 are still moved at the same feeding speed V in said feeding direction F.

FIG. 4 shows the situation in which the cutting member 2 has been recessed in the recessing direction E opposite to the cutting direction K into the recessed position to release the continuous strip S, that is now instead retained by the manipulator 5, from the cutting member 2. Hence, the cutting member 2 can now be retracted in the retraction direction R towards the cutting position C independently of the continuous strip S.

Figure 5:
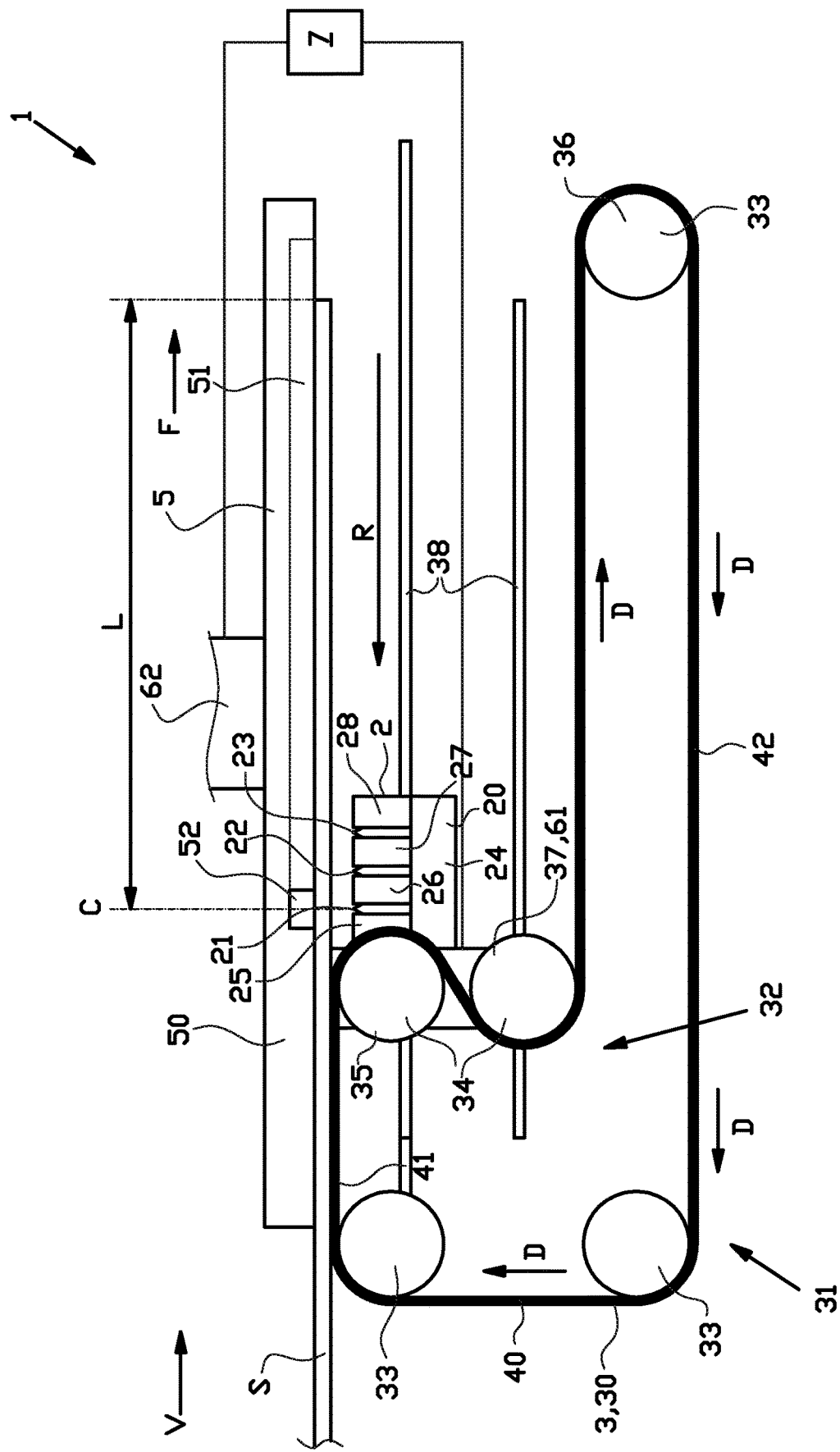

FIG. 5 shows the situation in which the feeding member 3 is retracted in the retraction direction R to expose the length L of the continuous strip S to the cutting member 2 at the cutting position C. As the feeding member 3 is retracted in the retraction direction R, the manipulator 5 retains and moves the length L of the continuous strip S further at the feeding speed V in the feeding direction F. In the case of the telescopic feeding conveyor 30, the telescopic portion 32 and the cutting member 2 mounted thereto are retracted together in the retraction direction R until one of the knives 21-23, in this example the first knife 21, is aligned with the cutting position C in the cutting direction K. The skilled person will appreciate that aligning a different knife 22, with the cutting position C will simply involve retracting the telescopic portion 32 and the cutting member mounted thereto further in the retraction direction R over the distance by which the knives 21-23 are spaced apart. Meanwhile, the feeding member 3 has continued to advance the continuous strip S into the cutting device 1 at the feeding speed V and the manipulator 5 has continued to move the length L of the continuous strip S that is retained thereto in the feeding direction F at the same feeding speed V.

Figure 6:
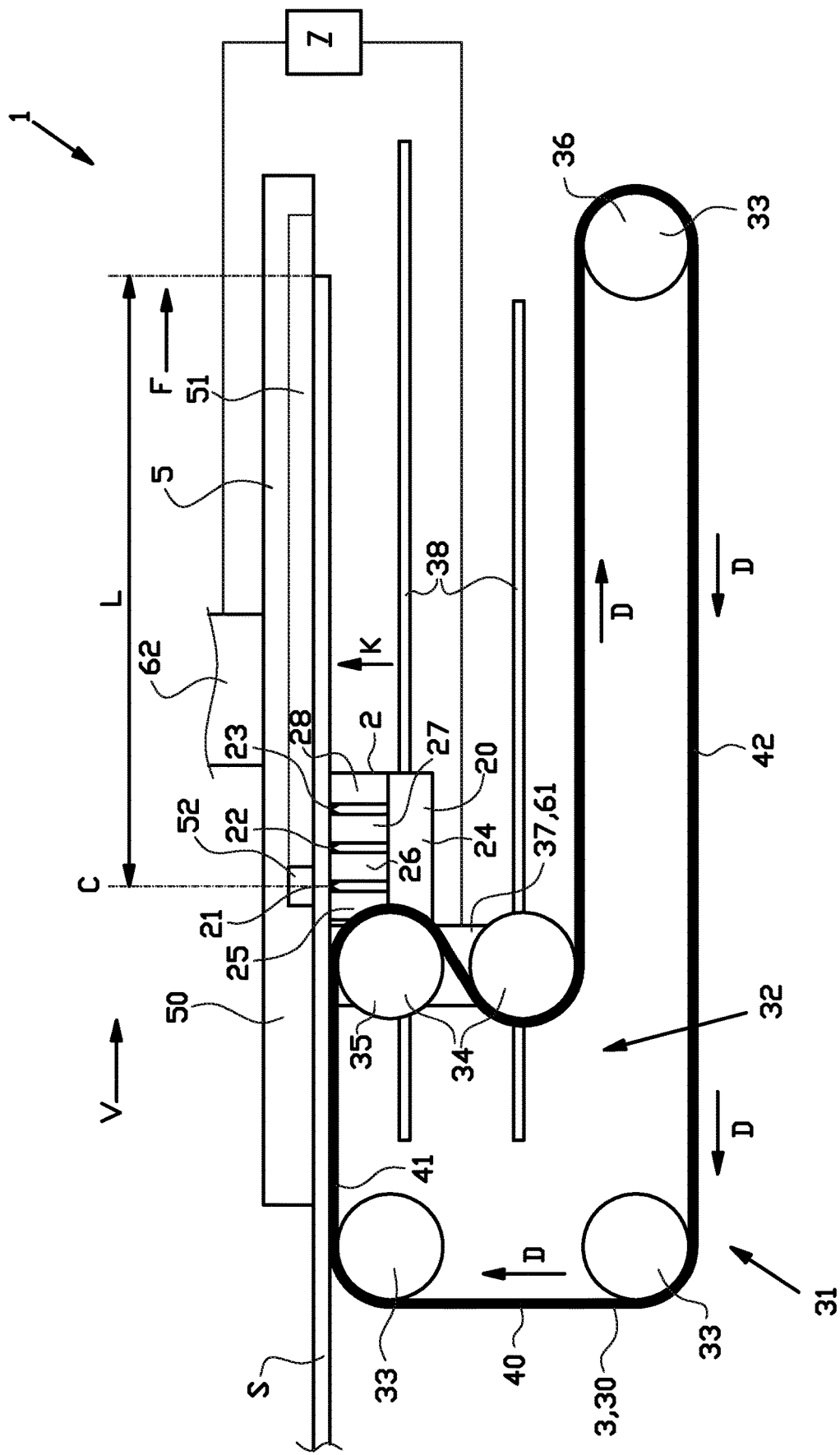

FIG. 6 shows the situation in which the cutting member 2 has been moved back in the cutting direction K into contact with the continuous strip S at the cutting position C. The cutting member 2 is now ready for cutting-off the length L of the continuous strip S at the cutting position C. Meanwhile, the feeding member 3 has continued to advance the continuous strip S into the cutting device 1 at the feeding speed V and the manipulator 5 has continued to move the length L of the continuous strip S that is retained thereto in the feeding direction F at the same feeding speed V.

FIG. 7 shows the actual cutting-off of the length L of the continuous strip S at the cutting position C. In this example, this is effectuated by moving the first knife 21 in the cutting direction K through the material of the continuous strip S at the cutting position S. In particular, the first knife 21 is moved in the cutting direction K onto the anvil 52 at the cutting position C on the manipulator 5. Meanwhile, the feeding member 3 has continued to feed the continuous strip S into the cutting device 1 at the feeding speed V and the manipulator 5 has continued to move the length L of the continuous strip S that is retained thereto in the feeding direction F at the same feeding speed V.

Figure 8:
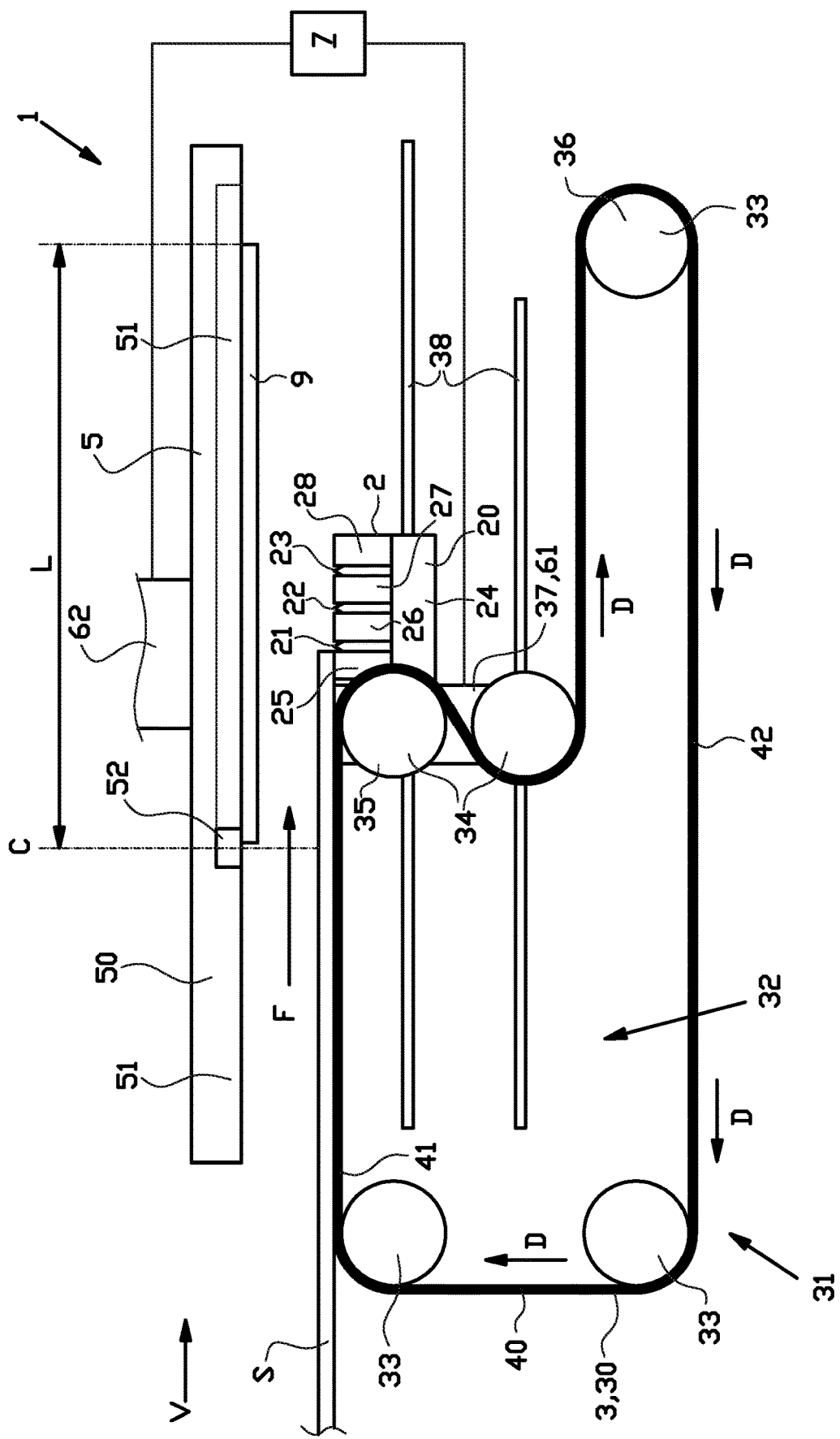

FIG. 8 shows the situation in which the length L of the continuous strip S has been cut-off. Now that the length L has been cut-off, the manipulator 5 can be moved elsewhere independently from the continuous strip S to discharge the cut-off length L, e.g. to a discharge device (not shown). Meanwhile, the feeding member 3 is already feeding a new or subsequent length L of the continuous strip S at the feeding speed V in the feeding direction F into the cutting device 1 for a subsequent cycle of the method.

Throughout the cutting steps as shown in FIGS. 5, 6 and 7, the cutting member 2 and the manipulator 5 are moved together in the feeding direction F to cut-off of the length L of the continuous strip S with respect to the cutting position C on the manipulator 5 while moving the length L of the continuous strip S in said feeding direction F. As the manipulator 5 moves, the cutting position C is moved with the manipulator 5 in the feeding direction F. Preferably, the cutting steps of FIGS. 5, 6 and 7 are performed while continuously moving the continuous strip S at a constant or substantially constant feeding speed V, e.g. by continuously driving the endless belt 40 of the telescopic feeding conveyor 30 in the conveyance direction D, by continuously moving the manipulator 5 at the same feeding speed V and by moving the cutting member 2 at the same feeding speed V to follow or keep up with the cutting position C on the manipulator 5. Hence, the cutting steps do not delay or interrupt the feeding of the continuous strip S in the feeding direction F. In fact, by continuously feeding the continuous strip S in the feeding direction F during the cutting steps, a new or subsequent length L of the continuous strip S is already being prepared on the feeding member 3, thereby significantly reducing the cycle time.

More in particular, the cutting device 1 according to the invention is arranged for continuously feeding the length L of the continuous strip S in the feeding direction F during the feeding, retracting, take over and cutting-off, as shown in FIGS. 1-8.

Hence, in contrast to the prior art devices, the cutting device 1 according to the present invention does not require buffer members, e.g. in the form of a dancer roller or a festooner, upstream of the cutting device 1.

When aligning a different knife 21-23 with the cutting position C on the manipulator 5, the leading end of the continuous strip S may still have a shape that corresponds to the cutting profile P1-P3 of the previously used knife 21-23. Hence, prior to starting a new cycle of the method, the steps of the method are performed for a relatively short length of the continuous strip S, e.g. a waste length, to cut-off the previously cut leading end of the continuous strip S to create a new leading end at the continuous strip S that corresponds to the cutting profile P1-P3 of the newly aligned knife 21-23. The waste length may be disposed manually or discharge to a waste bin by the manipulator 5.

Figure 10:
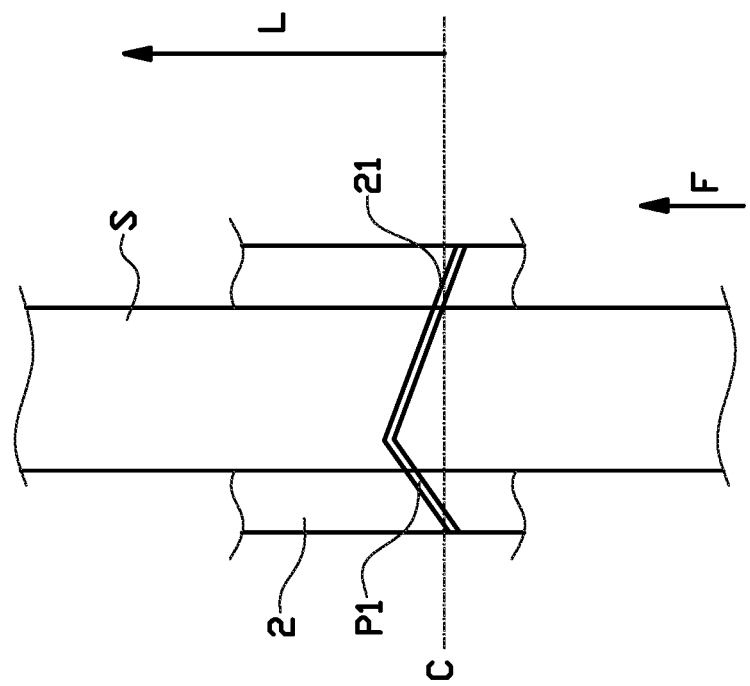
FIG. 10 shows a top view of an alternative alignment of the continuous strip with respect to the cutting member of FIG. 9.

FIG. 10 shows a top view of the cutting member 2, similar to FIG. 9, during a step of an alternative method in which the feeding member 3 of FIG. 1 is arranged for feeding the continuous strip S past the cutting position C along feeding path in the feeding direction F, wherein the feeding path and the symmetry of the first cutting profile P1 are offset with respect to each other. Because of the offset, it is possible to cut-off the length L of the continuous strip S asymmetrically with the symmetrical first cutting profile P1. An asymmetric cut may be useful when wrapping a gum strip around the edge of a breaker ply, where the part of the gum strip at one side of the breaker ply is supposed to be larger than the part of the gum strip at the other side of the breaker ply.

Figure 11:
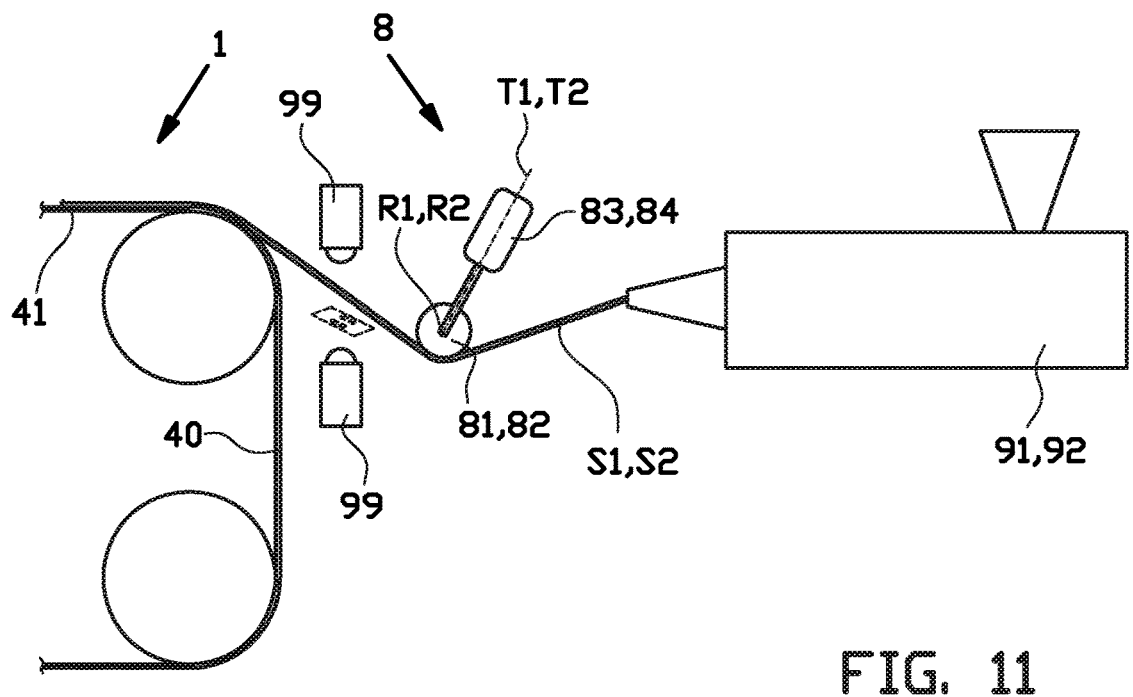
FIGS. 11 and 12 show a side view and a top view, respectively, of a feeding section upstream of the cutting device.
Figure 12:
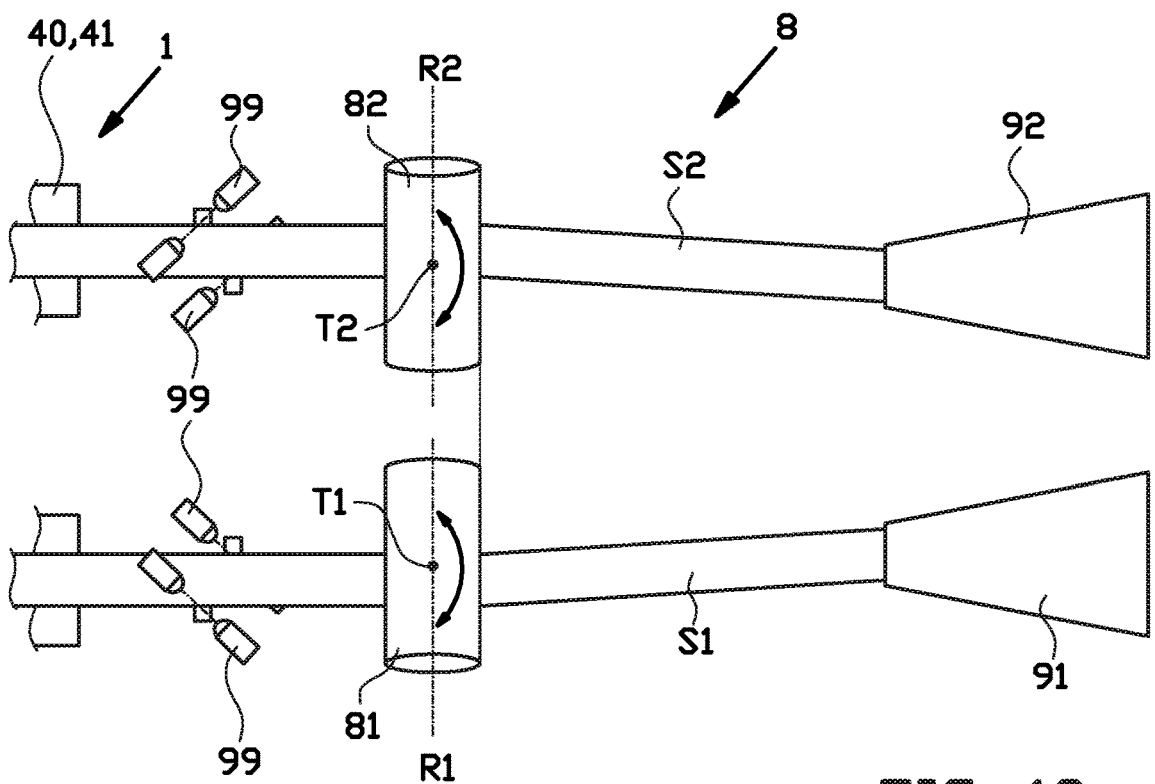

FIGS. 11 and 12 show an optional feeding section 8 upstream of the cutting device 1 with respect to the feeding direction F. The feeding section 8 can be used to optimally adjust, correct and/or align the position and/or direction of the continuous strip S or, as in this example, a first continuous strip S1 and a second continuous strip S2. The feeding section 8 is preferably located between the source of the strip(s) S1, S2, e.g. one or more extruders 91, 92, and the transport run 41 of the endless belt 40 of the cutting device 1. The feeding section 8 comprises a first steering roller 81 and a second steering roller 82 for steering the first continuous strip S1 and the second continuous strip S2, respectively.

The first steering roller 81 and the second steering roller 82 are freely rotatable about a first roller axis R1 and a second roller axis R2, respectively.

The feeding section 8 further comprises a first steering holder 83 and a second steering holder 84 for holding the first steering roller 81 and the second steering roller 82, respectively. The first steering holder 83 and the second steering roller 84 are rotatable about a first steering axis T1 and a second steering axis T2, respectively, perpendicular to the first roller axis R1 and the second roller axis R2, respectively. The feeding section 8 is further provided with a first steering drive and a second steering drive 86 for driving the first steering holder 83 and the second steering holder 84 in a steering rotation about the respective steering axes T1, T2. The steering holders 83, 84 are manually positioned on the strips S1, S2 such that the respective steering rollers 81, 82 form a loop or a slacking in the respective strips S1, S2 between the extruders 91, 92 and the endless belt 40 of the cutting device 1. Hence, the strips S1, S2 are pulled and/or tensioned in the area between the steering rollers 81, 82 and the endless belt 40. Preferably, the steering holders 83, 84 are positioned in an orientation relative to the strips S1, S2 such that the respective steering axes T1, T2 are in a direction normal to the longitudinal direction of the continuous strip S1, S2.

The feeding section 8 is further provided with one or more sensors 99 for detecting the edges, the width, the height and/or overall shape of the strips S1, S2. In this example, the one or more sensors 99 are provided in a position downstream of the steering rollers 81, 82 in the feeding direction F. Alternatively, the one or more sensors 99 may also be provided at or upstream of the steering rollers 81, 82. The one or more sensors 99 are operationally connected to the steering drives 85, 86. As a result, the steering holders 83, 84 and the steering rollers 81, 82 supported thereto can be rotated about the respective steering axes T1, T2 in response to the measurements of the one or more sensors 99, in particular in response to detecting a misalignment one or both of the strips S1, S2.

Figure 13:
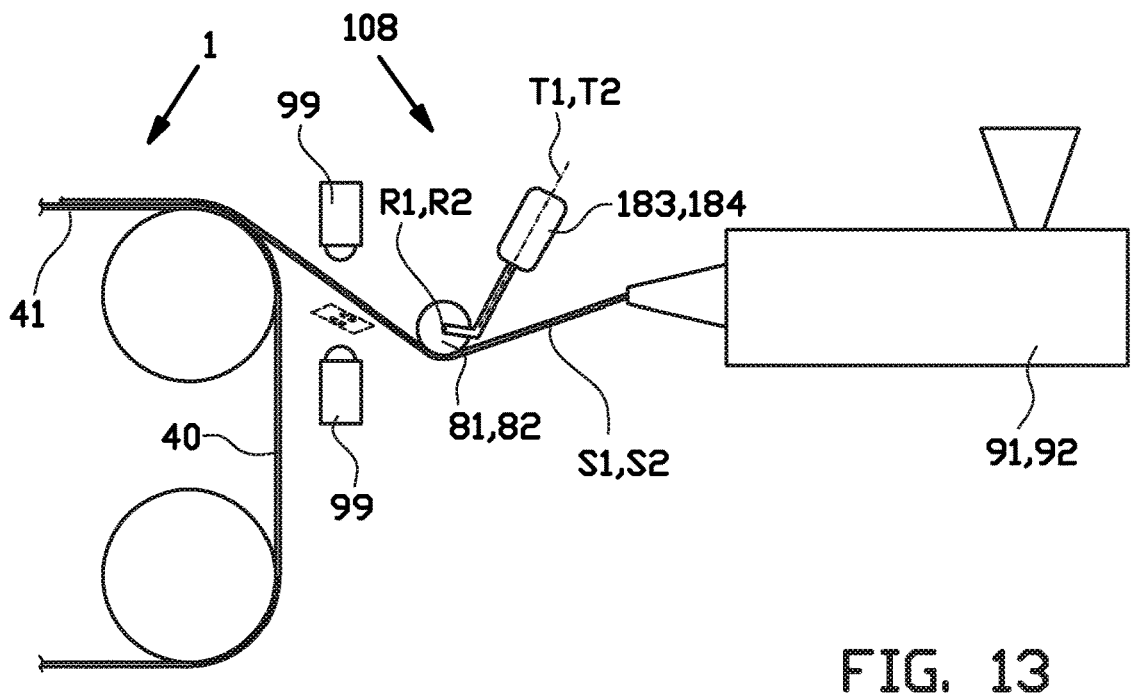
FIGS. 13 and 14 show a side view and a top view, respectively, of an alternative feeding section.
Figure 14:
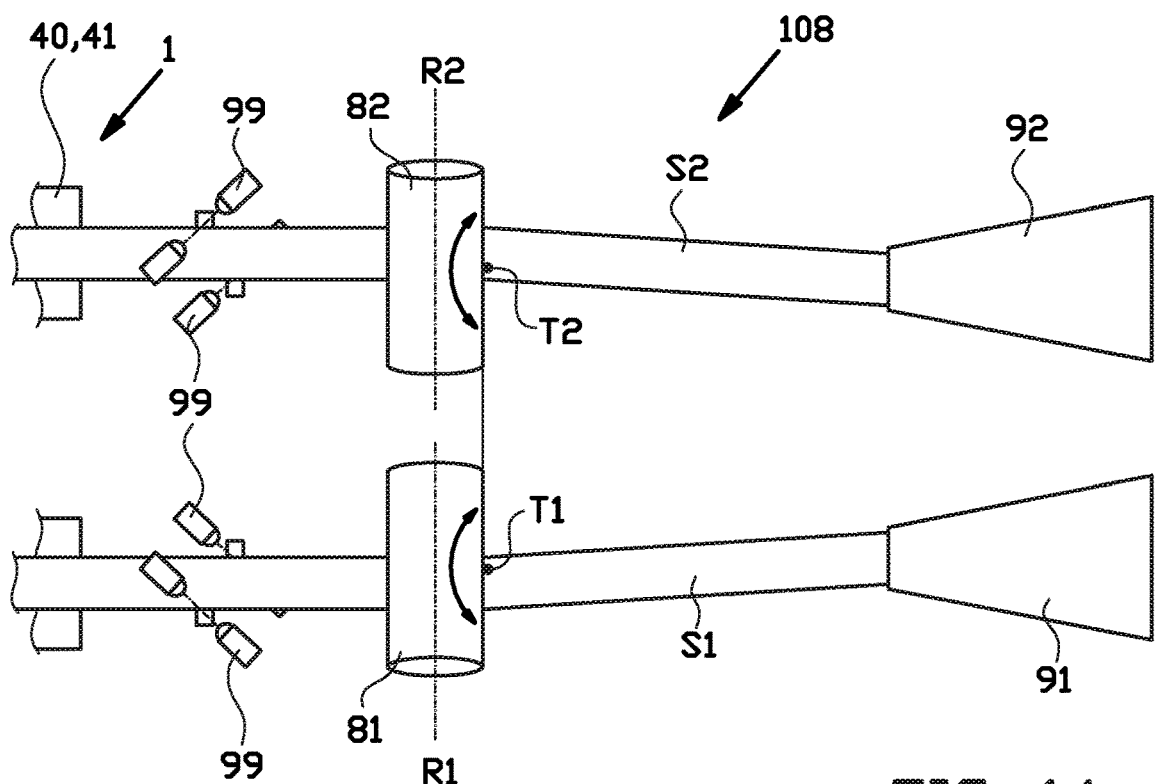

FIGS. 13 and 14 show an alternative embodiment of the feeding section 108 featuring alternative steering holders 183, 184 which hold the steering rollers 81, 82 in a position that is offset with respect to the respective steering axes R1, R2 in the feeding direction F. Hence, a controlled rotation of the steering rollers 81, 82 about said steering axes T1, T2 immediately pulls a portion of the strip(s) S1, S2 that is already downstream of the steering axes T1, T2 into alignment such that the adjustment, correction and/or alignment of the strips S1, S2 can occur much faster.

Although the abovementioned feeding section 8 has been shown in relation to the cutting device 1, it will be apparent to one skilled in the art that its application is wider than the example as shown. The same feeding section 8 could also be successfully implemented in any tire building machine where adjustment, correction and/or alignment of a continuous strip upstream of a station is required.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

In summary, the invention relates to a cutting device 1 and a method for cutting-off a length L of a continuous strip S to form a tire component 9, wherein the cutting device 1 comprises a cutting member 2 for cutting the continuous strip S at a cutting position C and a feeding member 3 that is movable in a feeding direction F for feeding the length L of the continuous strip S in said feeding direction F past said cutting position C, wherein the feeding member 3 is retractable in a retraction direction R and wherein the cutting device 1 further comprises a manipulator 5 for retaining the length L as the feeding member 3 is retracted in the retraction direction R, wherein the cutting position C is located on the manipulator 5 and wherein the cutting member 2 and the manipulator 5 are movable together in the feeding direction F to cut-off of the length L of the continuous strip S at the cutting position C on the manipulator 5 while moving the length L of the continuous strip S in said feeding direction F.

The invention claimed is:

1. A cutting device for cutting-off a length of a continuous strip to form a tire component, wherein the cutting device comprises a cutting member for cutting the continuous strip at a cutting position and a feeding member that is movable in a feeding direction past the cutting position for feeding the length of the continuous strip in said feeding direction past said cutting position, wherein the feeding member is at least partially retractable in a retraction direction for exposing the length of the continuous strip to the cutting member at the cutting position, and wherein the cutting device further comprises a manipulator for taking over and retaining the length of the continuous strip from the feeding member as the feeding member is retracted in the retraction direction, wherein the cutting position is located on the manipulator and wherein the cutting member is movable towards said cutting position on the manipulator, wherein the cutting member and the manipulator are movable together in the feeding direction to cut-off of the length of the continuous strip at the cutting position on the manipulator while moving the length of the continuous strip in said feeding direction.

2. The cutting device according to claim 1, wherein the cutting device comprises a first drive for driving the movement of the cutting member in the feeding direction and a second drive for driving the movement of the manipulator in the feeding direction, wherein the first drive and the second drive are synchronized to move the cutting member and the manipulator, respectively, at the same feeding speed in the feeding direction during the cutting-off of the length of the continuous strip.

3. The cutting device according to claim 2, wherein the cutting device further comprises a control unit for controlling the first drive and the second drive to synchronously move the cutting member and the manipulator, respectively, at the same feeding speed in the feeding direction during the cutting-off of the length of the continuous strip.

4. The cutting device according to claim 1, wherein the cutting member is movable together with the feeding member in the feeding direction and the retraction direction.

5. The cutting device according to claim 4, wherein the feeding member is a telescopic feeding conveyor that is extendable in the feeding direction past the cutting position and retractable in the retraction direction opposite to the feeding direction past the cutting position.

6. The cutting device according to claim 5, wherein the telescopic feeding conveyor comprises a fixed portion that is fixed in the feeding direction and a telescopic portion that is movable with respect to the fixed portion in the feeding direction and the retraction direction, wherein the cutting member is fixed with respect to the telescopic portion in the feeding direction and the retraction direction.

7. The cutting device according to claim 6, wherein the cutting device comprises a first drive for driving the movement of the cutting member in the feeding direction and a second drive for driving the movement of the manipulator in the feeding direction, wherein the first drive and the second drive are synchronized to move the cutting member and the manipulator, respectively, at the same feeding speed in the feeding direction during the cutting-off of the length of the continuous strip, wherein the first drive is arranged for driving both the telescopic portion of the telescopic feeding conveyor and the movement of the cutting member.

8. The cutting device according to claim 1, wherein the manipulator is provided with an anvil member at the cutting position for cooperating with the cutting member to cut-off the length of the continuous strip.

9. The cutting device according to claim 1, wherein the cutting member comprises a first knife that is movable in a cutting direction towards the cutting position on the manipulator to cut-off the length of the continuous strip at the cutting position along a first cutting profile.

10. The cutting device according to claim 9, wherein the first cutting profile is at least partially linear, non-linear, V-shaped, symmetric or asymmetric.

11. The cutting device according to claim 9, wherein the first cutting profile is a non-linear cutting profile that has a symmetry, wherein the feeding member is arranged for feeding the continuous strip past the cutting position along feeding path in the feeding direction, wherein the feeding path and the symmetry of the first cutting profile are offset with respect to each other.

12. The cutting device according to claim 9, wherein the cutting member comprises a first retaining element for retaining the length of the continuous strip to the cutting member at or near the first cutting profile.

13. The cutting device according to claim 9, wherein the cutting member comprises a second knife that is movable in the cutting direction towards the cutting position on the manipulator to cut-off the length of the continuous strip at the cutting position along a second cutting profile that is different from the first cutting profile.

14. The cutting device according to claim 13, wherein the cutting member comprises a knife actuator that is arranged for selectively moving one of the first knife and the second knife with respect to the other of the first knife and the second knife in the cutting direction towards the cutting position on the manipulator.

15. The cutting device according to claim 13, wherein prior to the cutting the cutting member is movable with respect to the manipulator to align one of the first knife and the second knife in the cutting direction with the cutting position on the manipulator.

16. The cutting device according to claim 13, wherein the first knife and the second knife are spaced apart in the feeding direction.

17. The cutting device according to claim 13, wherein the cutting member comprises a second retaining element for retaining the length of the continuous strip between the first cutting profile and the second cutting profile.

18. The cutting device according to claim 1, wherein the manipulator comprises a retaining element for retaining the length of the continuous strip to the manipulator.

19. The cutting device according to claim 18, wherein the retaining element is a vacuum retaining element or a magnetic retaining element.

20. A method for cutting-off a length of a continuous strip to form a tire component, wherein the method comprises the steps of:

providing a cutting device which comprises a cutting member for cutting the continuous strip at a cutting position and a feeding member that is movable in a feeding direction past the cutting position for feeding the length of the continuous strip in said feeding direction past said cutting position, wherein the feeding member is at least partially retractable in a retraction direction for exposing the length of the continuous strip to the cutting member at the cutting position, and wherein the cutting device further comprises a manipulator for taking over and retaining the length of the continuous strip from the feeding member as the feeding member is retracted in the retraction direction, wherein the cutting position is located on the manipulator and wherein the cutting member and the manipulator are movable together in the feeding direction to cut-off of the length of the continuous strip at the cutting position on the manipulator while moving the length of the continuous strip in said feeding direction;

using the feeding member to feed the length of the continuous strip in the feeding direction past the cutting position;

using the manipulator to take over and retain the length of the continuous strip from the feeding member;

retracting at least a part of the feeding member in the retraction direction to expose the length of the continuous strip to the cutting member at the cutting position while retaining the length of the continuous strip as the feeding member is retracted in the retraction direction;

moving the cutting member towards the cutting position on the manipulator; and moving the cutting member and the manipulator together in the feeding direction to cut-off of the length of the continuous strip at the cutting position on the manipulator while moving the length of the continuous strip in said feeding direction.

21. The method according to claim 20, wherein the cutting device is arranged for continuously feeding the length of the continuous strip in the feeding direction during the feeding, retracting, take over and cutting-off.

22. The method according to claim 21, wherein a subsequent length of the continuous strip is already being fed in the feeding direction towards the cutting position as the previous length of the continuous strip is being cut-off.

23. The method according to claim 20, wherein the cutting member and the manipulator are synchronously moved at the same feeding speed in the feeding direction during the cutting-off of the length of the continuous strip.

24. The method according to claim 20, wherein the cutting member is moved together with the feeding member in the feeding direction and the retraction direction.

25. The method according to claim 24, wherein the feeding member is a telescopic feeding conveyor with a fixed portion that is fixed in the feeding direction and a telescopic portion that is movable with respect to the fixed portion in the feeding direction and the retraction direction, wherein the cutting member is fixed with respect to the telescopic portion in the feeding direction, wherein the telescopic portion of the telescopic feeding conveyor and the cutting member are moved together.

26. The method according to claim 20, wherein the cutting member comprises a first knife that is arranged to cut-off the length of the continuous strip at the cutting position along a first cutting profile, wherein the cutting member comprises a second knife that is arranged to cut-off the length of the continuous strip at the cutting position along a second cutting profile that is different from the first cutting profile, wherein one of the first knife and the second knife is selectively moved with respect to the other of the first knife and the second knife in a cutting direction towards the cutting position on the manipulator.

27. The method according to claim 26, wherein prior to the cutting the cutting member is moved with respect to the manipulator to align one of the first knife and the second knife in the cutting direction with the cutting position on the manipulator.

28. The method according to claim 26, wherein the method further comprises the step of aligning a different one of the first knife and the second knife prior to cutting a subsequent length of the continuous strip, wherein the method further comprises the step of cutting a waste length of the continuous strip to form a new leading end of the continuous strip that has been cut with the different knife.

29. The method according to claim 20, wherein the cutting member comprises a first knife that is arranged to cut-off the length of the continuous strip at the cutting position along a symmetric, non-linear first cutting profile, wherein the feeding member is arranged for feeding the continuous strip past the cutting position along feeding path in the feeding direction, wherein the feeding path and the symmetry of the first cutting profile are offset with respect to each other.

30. The method according to claim 20, wherein the cutting device is used to cut-off the length of the continuous strip to form a gum strip.

* * * * *